(12) United States Patent
Takehara

(10) Patent No.: US 10,287,163 B2
(45) Date of Patent: May 14, 2019

(54) HYDROGEN GENERATION CONTAINER WITH AIR-PERMEABLE AND WATER-IMPERMEABLE FILMS

(71) Applicant: Takashi Takehara, Osaka (JP)

(72) Inventor: Takashi Takehara, Osaka (JP)

( * ) Notice: Subject to any disclaimer, the term of this patent is extended or adjusted under 35 U.S.C. 154(b) by 109 days.

(21) Appl. No.: 15/006,830

(22) Filed: Jan. 26, 2016

(65) Prior Publication Data

US 2016/0207765 A1  Jul. 21, 2016

Related U.S. Application Data

(63) Continuation-in-part of application No. PCT/JP2013/083120, filed on Dec. 10, 2013.

(30) Foreign Application Priority Data

Jul. 26, 2013  (JP) .................................. 2013-155262

(51) Int. Cl.
*C01B 3/08* (2006.01)
*C01B 3/06* (2006.01)
(Continued)

(52) U.S. Cl.
CPC .................... *C01B 3/08* (2013.01); *B01J 7/02* (2013.01); *B01J 8/02* (2013.01); *C01B 3/065* (2013.01);
(Continued)

(58) Field of Classification Search
CPC .............. C01B 2203/0405; C01B 3/08; C01B 2203/041; C01B 3/04; C01B 3/065;
(Continued)

(56) References Cited

U.S. PATENT DOCUMENTS 5,064,446 A * 11/1991 Kusuki ................ B01D 53/226
  95/53
2005/0121399 A1 * 6/2005 Hayashi ................ A61K 33/00
  210/749
(Continued)

FOREIGN PATENT DOCUMENTS

JP  2004-243151 A  9/2004
JP  2004-41949 A  12/2004
(Continued)

OTHER PUBLICATIONS

Machine Translation of JP 2004-243151-A.*
Translation of JP 2004-243151-A.*

*Primary Examiner* — Imran Akram
(74) *Attorney, Agent, or Firm* — Novick, Kim & Lee, PLLC; Jae Youn Kim

(57) ABSTRACT

Disclosed is a hydrogen water generator that is capable of preventing an increase in pH so as to prevent alkalinization of water while generating water containing plenty of hydrogen gas. A hydrogen water generator 20 includes a container 21 having water 22 and magnesium particles 23, capable of reacting with the water 22 to generate hydrogen gas, encapsulated therein, wherein the container 21 is made of an air-permeable and water-impermeable material, which allows the hydrogen gas to pass from the inside to the outside of the container and prevents the water from passing from the inside to the outside of the container. At least one kind of thermoplastic resin selected from a group consisting of (A) polyvinylidene chloride, (B) polyvinyl chloride, and (C) polyacrylonitrile may be used as the air-permeable and water-impermeable material.

1 Claim, 10 Drawing Sheets

(51) Int. Cl.
*B01J 8/02* (2006.01)
*C02F 1/68* (2006.01)
*B01J 7/02* (2006.01)
*C02F 1/70* (2006.01)

(52) U.S. Cl.
CPC ....... *C02F 1/68* (2013.01); *B01J 2208/00893* (2013.01); *C02F 1/70* (2013.01); *Y02E 60/36* (2013.01)

(58) Field of Classification Search
CPC ... C01B 3/10; C01B 6/00; C01B 3/501; B01F 15/0224; Y02E 60/36; Y02E 60/321; Y02E 60/364
See application file for complete search history.

(56) References Cited

U.S. PATENT DOCUMENTS

| | | | | |
|---|---|---|---|---|
| 2007/0031325 | A1* | 2/2007 | Carruthers | B01D 53/228 423/658.2 |
| 2007/0128104 | A1* | 6/2007 | Hayashi | A61K 33/06 423/648.1 |
| 2007/0221556 | A1* | 9/2007 | Chung | C02F 1/003 210/198.1 |
| 2008/0193806 | A1* | 8/2008 | Kulakov | C01B 3/10 429/515 |
| 2008/0311225 | A1* | 12/2008 | Shiga | C02F 1/4606 424/682 |
| 2010/0005960 | A1* | 1/2010 | Noda | C01B 3/501 95/56 |
| 2011/0111048 | A1* | 5/2011 | Satoh | A61M 1/1656 424/529 |
| 2012/0087990 | A1* | 4/2012 | Shiga | C02F 1/461 424/600 |
| 2012/0225010 | A1* | 9/2012 | Boyle | C01B 3/08 423/657 |
| 2013/0019757 | A1* | 1/2013 | Satoh | B01F 13/0022 99/323.1 |

FOREIGN PATENT DOCUMENTS

| | | |
|---|---|---|
| JP | 2007-301522 A | 11/2007 |
| JP | 2009-215114 A | 9/2009 |
| JP | 3164934 U | 12/2010 |
| WO | 2013-011732 A1 | 1/2013 |

* cited by examiner (a)

(b)

(c)

HYDROGEN GENERATION CONTAINER WITH AIR-PERMEABLE AND WATER-IMPERMEABLE FILMS

TECHNICAL FIELD

The present invention relates to a hydrogen generator that is capable of generating hydrogen water containing plenty of hydrogen gas and a hydrogen generation container using the hydrogen generator.

BACKGROUND ART

In recent years, the theory that water containing a large amount of hydrogen is effective in removing active oxygen, which causes various kinds of diseases, including cancer, has been published in the medical world and has gathered attention. A hydrogen water generator using the chemical reaction between magnesium particles and water is a known hydrogen water generator that generates water containing plenty of hydrogen. This kind of hydrogen water generator includes a case, configured to be placed in a bottle for drinking water and to be filled with water, and a water-permeable bag, disposed in the case and filled with magnesium particles, which are capable of reacting with drinking water to generate hydrogen gas (for example, see Patent Document 1).

RELATED ART DOCUMENT

Patent Document

Patent Document 1: Japanese Patent Application Publication No. 2004-41949

DISCLOSURE

Technical Problem

The hydrogen water generator disclosed in Patent Document 1 generates hydrogen gas according to chemical formula (1) below.

$$Mg + 2H_2O \rightarrow Mg(OH)_2 + H_2 \quad (1)$$

Because hydrogen gas is contained in drinking water as the result of the reaction between water and magnesium, it is possible to generate drinking water containing plenty of hydrogen gas. At the same time, however, the drinking water contains plenty of magnesium hydroxide.

As a result, the pH (hydrogen ion exponent) of the drinking water increases, and the drinking water is alkalinized.

It is an object of the present invention to provide a hydrogen water generator and a hydrogen water generation container that are capable of preventing an increase in pH so as to prevent alkalinization of water while generating water containing plenty of hydrogen gas.

Technical Solution (1) A hydrogen generator according to the present invention includes a container having water and magnesium particles, capable of reacting with the water to generate hydrogen gas, encapsulated therein, wherein the container is made of an air-permeable and water-impermeable material, which allows the hydrogen gas to pass from the inside to the outside of the container and prevents the water from passing from the inside to the outside of the container.

(2) In the hydrogen generator described in paragraph (1), the air-permeable and water-impermeable material may be a thermoplastic resin.

(3) In the hydrogen generator described in paragraph (2), the thermoplastic resin may be at least one selected from a group consisting of (A) polyvinylidene chloride, (B) polyvinyl chloride, and (C) polyacrylonitrile.

(4) In addition, the present invention provides a hydrogen generation container configured to have a structure in which the hydrogen generator is connected to the bottom of a bottle body such that the hydrogen generation container is formed to have a single complete bottle shape. In the hydrogen generation container, the air-permeable and water-impermeable material is inserted between the bottom of the bottle body and the upper part of the hydrogen generator, and hydrogen gas generated by the hydrogen generator passes through the air-permeable and water-impermeable material and enters the bottle body.

The hydrogen generator is formed to have a single complete bottle shape, and the hydrogen generator described in paragraphs (1) to (3) is separably connected to the bottom of the bottle body. The air-permeable and water-impermeable material is inserted between the bottle body and the hydrogen generator such that hydrogen gas passes through the air-permeable and water-impermeable material and enters the bottle body. As a result, the hydrogen gas is contained in the liquid in the bottle body.

(5) In the hydrogen generation container described in paragraph (4), one selected from between a screw thread and a screw groove may be provided at the bottom of the bottle body, and the other selected from between the screw thread and the screw groove may be provided at the upper part of the hydrogen generator, the screw thread and the screw groove being screw-engaged with each other.

(6) In addition, the present invention provides a hydrogen generation container to which the hydrogen generator described in paragraphs (1) to (3) is applied. The hydrogen generation container includes a bar-shaped case body having a hollow part, into which the magnesium particles are injected together with the water, and a plurality of windows allowing the hollow part to communicate with the outside of the case body, and a film made of the air-permeable and water-impermeable material is adhered at least to the windows by insert molding.

(7) In the hydrogen generation container described in paragraph (6), the case body may be constituted by superimposing two cover members, and the windows may be formed in at least one of the cover members.

(8) In the hydrogen generation container described in paragraph (6) or (7), the case body may have an injection unit that is formed at one end of the case body in a longitudinal direction thereof and communicates with the hollow part to inject water into the hollow part, and the hydrogen generation container may further include a sealing member for sealing the injection unit.

(9) In the hydrogen generation container described in paragraph (8), a water bag having water encapsulated therein may be received in the hollow part in advance, and the sealing member may include a needle-shaped protrusion protruding from the tip thereof for breaking through the water bag such that the water in the water bag is injected into the hollow part.

(10) Furthermore, in the hydrogen generator described in paragraphs (1) to (3), a gel-state water retainer may be encapsulated in the container together with the magnesium particles.

(11) In addition, another embodiment of the present invention provides a hydrogen generation container including a hydrogen gas generation container, into which water and hydrogenated aluminum powder, capable of reacting with the water to generate hydrogen gas, are injected, and a hydrogen gas guide pipe including a hollow part defined therein and a plurality of windows for allowing the hollow part to communicate with the outside of the hydrogen gas guide pipe, wherein at least one partition, formed using a film made of the air-permeable and water-impermeable material, is provided in the hollow part, the film made of the air-permeable and water-impermeable material is adhered to the windows by insert molding, and the hydrogen gas generation container and the hydrogen gas guide pipe are connected to each other by screw-engagement therebetween.

(12) The hydrogen gas guide pipe may be provided with a maintenance hole, which communicates with a hollow part defined in the hydrogen gas guide pipe, and the maintenance hole may be closed by a maintenance cover, which is selectively removable.

(13) Furthermore, another embodiment of the present invention provides a hydrogen generation container including a hydrogen gas generation container, into which water and hydrogenated aluminum powder, capable of reacting with the water to generate hydrogen gas, are injected, and a hydrogen gas guide pipe comprising a hollow part defined therein and a plurality of films for allowing the hollow part to communicate with the outside of the hydrogen gas guide pipe, wherein the films are arranged at predetermined intervals to partition the hollow part of the hydrogen gas guide pipe in an axial direction.

(14) In addition, a further embodiment of the present invention provides a hydrogen generator including a container having water, magnesium particles, capable of reacting with the water to generate hydrogen gas, and a flavor ingredient encapsulated therein, wherein the container is made of an air-permeable and water-impermeable material, which allows the hydrogen gas and the flavor ingredient to pass from the inside to the outside of the container and prevents the water from passing from the inside to the outside of the container.

(15) In the hydrogen generator described in paragraph (14), the air-permeable and water-impermeable material may be a thermoplastic resin.

(16) In the hydrogen generator described in paragraph (15), the thermoplastic resin may be at least one selected from a group consisting of (A) polyvinylidene chloride, (B) polyvinyl chloride, and (C) polyacrylonitrile.

(17) In the hydrogen generator described in paragraphs (14) to (16), the flavor ingredient may contain at least one kind of compound selected from a group consisting of (R)-4-(2,6,6-trimethyl-2-cyclohexene-1-yl)-3-butene-2-one and (S)-4-(2,6,6-trimethyl-2-cyclohexene-1-yl)-3-butene-2-one as an effective ingredient.

Advantageous Effects

In a hydrogen water generator according to the present invention, a container is made of an air-permeable and water-impermeable material. In a state in which the hydrogen water generator is placed in a low tank or in a storage tank of a water server, therefore, it is possible to assuredly allow hydrogen gas to pass from the inside of the container to the outside of the container such that the hydrogen gas moves into water outside the container and, in addition, to prevent the water in the container from passing from the inside to the outside of the container, ensuring that the water cannot permeate into the water in the low tank or in the storage tank. Consequently, it is possible to greatly reduce the amount of magnesium hydroxide that permeates into the water in the low tank or in the storage tank from the inside of the container, as compared with a conventional hydrogen water generator. As a result, it is possible to prevent an increase in pH to such an extent that the water in the low tank or in the storage tank cannot be alkalinized and to enable the water in the low tank or in the storage tank to contain plenty of hydrogen gas.

In addition, in a hydrogen water generation container according to another embodiment of the present invention, the hydrogen water generator is directly fixed to the outside (the bottom) of a bottle body. Consequently, it is possible to constantly supply hydrogen gas into a liquid in the bottle body while preventing the liquid in the bottle body from being alkalinized. As a result, it is possible to provide a liquid, such as skin lotion, which is required not to be alkalinized, in a state in which hydrogen gas is contained in a simple dedicated container.

In addition, a hydrogen water generation container according to another embodiment of the present invention includes a bar-shaped case body having a hollow part, into which the magnesium particles are injected together with the water, and a plurality of windows allowing the hollow part to communicate with the outside of the case body, and a film made of the air-permeable and water-impermeable material is adhered at least to the windows by insert molding. When a user injects prepared water into the hollow part, therefore, the magnesium particles start to chemically react with the water, and hydrogen gas, generated as the result of the chemical reaction, is discharged from the hollow part out of the hydrogen water generation container through the respective windows. Consequently, it is possible for the user to determine when it is possible to start to use the hydrogen water generation container. As a result, it is possible to prolong the lifespan of the hydrogen water generation container as a product.

Furthermore, in a hydrogen water generation container according to another embodiment of the present invention, it is possible to generate hydrogen gas using water and hydrogenated aluminum powder. In the chemical reaction for generating hydrogen gas using the water and the aluminum powder, a larger amount of hydrogen gas is generated ($2AlH_3 + 3H_2O \rightarrow Al_2O_3 + 6H_2$) than in a case of the chemical reaction for generating hydrogen gas using water and magnesium particles. As a result, it is possible to provide hydrogen water to the user in a short time.

Although hydrogen gas passes through micro holes formed in a film made of an air-permeable and water-impermeable material and thus permeates the film, the rapid generation of hydrogen gas, attributable to the chemical reaction for generating hydrogen gas using water and hydrogenated aluminum powder, causes expansion of the micro holes in the film when the hydrogen gas permeates the film, resulting in water leakage. In the hydrogen water generation container, however, the main body generally includes a hydrogen gas guide pipe and a hydrogen gas generation container. Consequently, the chemical reaction for generating hydrogen gas using the water and the hydrogenated aluminum powder and the guidance of the generated hydrogen gas to the outside of the hydrogen water generation container are performed in a partitioned state.

In addition, at least one partition, formed using the film made of the air-permeable and water-impermeable material, is provided in the hollow part of the hydrogen gas guide pipe. As a result, the partition becomes a membrane that hydrogen gas permeates primarily. Consequently, the hydrogen gas rapidly generated in the hydrogen gas generation container does not directly permeate the film adhered to the windows formed in the hydrogen gas guide pipe, but permeates the at least one partition, permeates the film adhered to the windows, and is then discharged from the hydrogen water generation container. As a result, the pressure at the time of generating the hydrogen gas is reduced by the partition, whereby it is possible to prevent expansion of the micro holes formed in the film adhered to the windows.

In addition, the hydrogen gas guide pipe is provided with a maintenance hole, which communicates with the hollow part defined in the hydrogen gas guide pipe. Consequently, it is possible to discharge water, collected between the partition provided in the hollow part defined in the hydrogen gas guide pipe and the film adhered to the windows (water that has leaked from the hydrogen gas generation container), from the hydrogen water generation container. In addition, the maintenance hole is closed by a maintenance cover, and a user may selectively remove the maintenance cover from the maintenance hole.

Furthermore, in a hydrogen water generation container according to another embodiment of the present invention, a plurality of films, made of the air-permeable and water-impermeable material, are arranged at predetermined intervals in an axial direction of the hydrogen gas guide pipe. When the interior of the hydrogen water generation container is filled with hydrogen gas, and the pressure in the hydrogen water generation container increases, the pressure is gradually reduced by the films. Consequently, even though the pressure in the hydrogen water generation container excessively increases, with the result that the micro holes formed in the first film are enlarged and water (vapor) permeates the first film in addition to hydrogen gas, the pressure in the hydrogen water generation container is gradually reduced before reaching subsequent films, with the result that the sizes of the micro holes formed in the subsequent films are gradually reduced and water is prevented from permeating the subsequent films. Consequently, it is possible to assuredly discharge only hydrogen gas from the hydrogen water generation container and to prevent water from being discharged from the hydrogen water generation container.

In a hydrogen water generator according to a further embodiment of the present invention, a container is made of an air-permeable and water-impermeable material. In a state in which the hydrogen water generator is placed in a container, such as a pet bottle, a glass bottle, or a can-type container, therefore, it is possible to assuredly allow hydrogen gas and a flavor ingredient to pass from the inside to the outside of the container such that the hydrogen gas and the flavor ingredient move to the water outside the container and, in addition, to prevent the water in the container from passing from the inside to the outside of the container, ensuring that the water cannot permeate into the water in the pet bottle, the glass bottle, or the can-type container. Consequently, it is possible to greatly reduce the amount of magnesium hydroxide that permeates into the water in the pet bottle, the glass bottle, or the can-type container from the inside of the container, as compared with a conventional hydrogen water generator. As a result, it is possible to prevent an increase in pH to such an extent that water in the pet bottle, the glass bottle, or the can-type container cannot be alkalinized and to enable the water in the pet bottle, the glass bottle, or the can-type container to contain plenty of hydrogen gas.

Furthermore, in the hydrogen water generator according to the present invention, it is possible to generate a flavor ingredient together with hydrogen gas. Consequently, it is possible to supply a flavor ingredient that has a unique fragrance and provides a relaxing feeling or a fresh feeling into the pet bottle, the glass bottle, or the can-type container.

DESCRIPTION OF DRAWINGS

FIG. 3(b) is a schematic view showing a function of generating hydrogen water without the generation of hydrogen gas or alkalinization in the hydrogen water generation container;

FIG. 4 is a view showing a hydrogen water generation container according to another embodiment of the present invention, wherein FIG. 4(a) is a perspective view of the hydrogen water generation container, and FIG. 4(b) is a front view of the hydrogen water generation container;

BEST MODE

An embodiment of a hydrogen water generator according to the present invention will be described.

Figure 1:
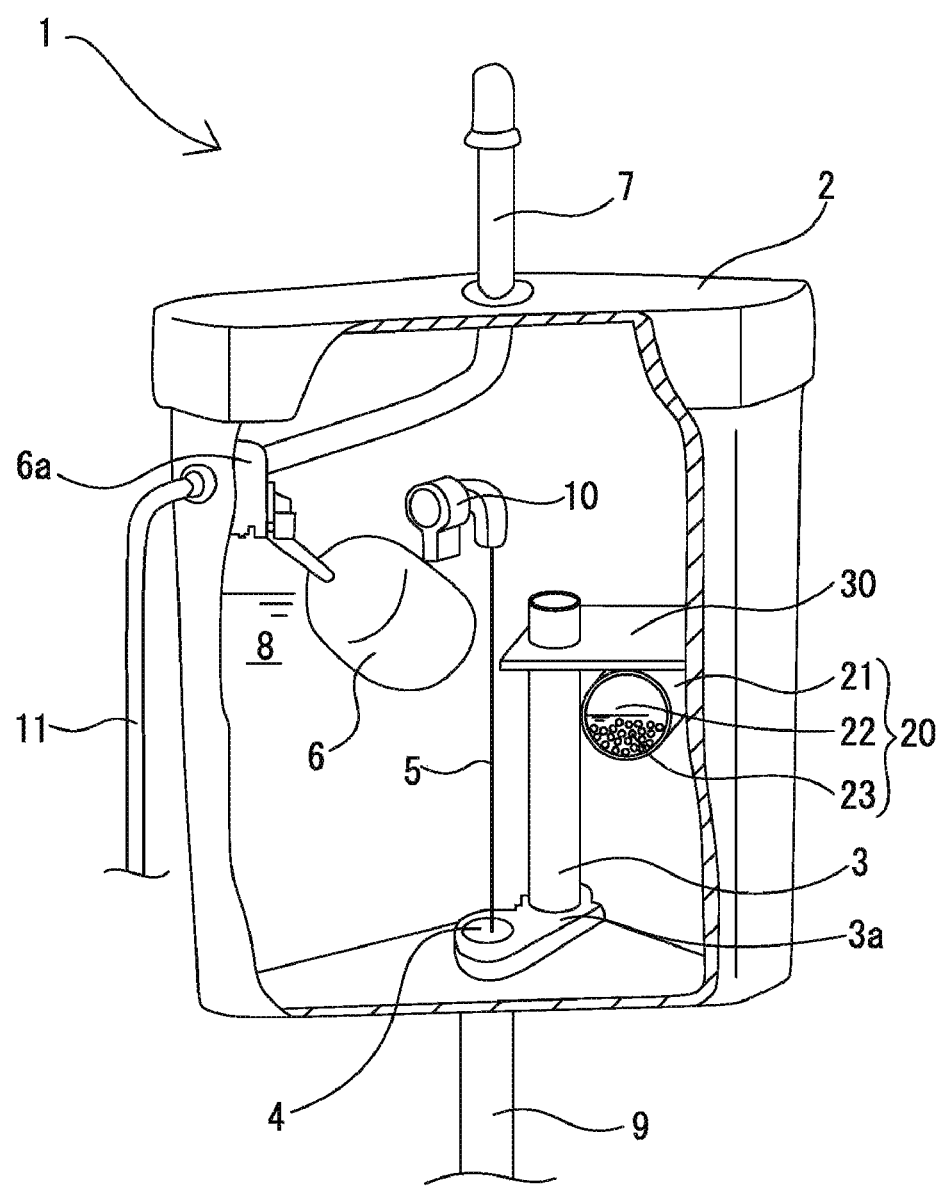
FIG. 1 is a view schematically showing the structure of an example of a toilet device to which a hydrogen water generator according to the present invention is applied.

FIG. 1 is a view schematically showing the structure of an example of a toilet device to which a hydrogen water generator according to the present invention is applied. The toilet device 1 shown in FIG. 1 is a conventional toilet device having a low tank 2. An overflow pipe 3, a float valve 4, a chain 5, a ball tap 6, and a hand-washing water supply pipe 7 are received in the low tank 2. Water 8 is stored in the low tank 2. The overflow pipe 3 is provided to allow the water 8 in the low tank 2 to flow out to a toilet bowl (not shown) through a flushing pipe 9 when the water 8 exceeds a predetermined water level. A base 3*a* of the overflow pipe 3 is fixed to the bottom of the low tank 2 such that the base 3*a* communicates with the flushing pipe 9 through a through hole (not shown). The base 3*a* has an opening (not shown) that is open inside the low tank 2. The float valve 4 is disposed in the opening. The float valve 4 is connected to a handle set 10 via the chain 5, which is suspended from a portion of the handle set 10 that is received in the low tank 2. The float valve 4 opens and closes the opening in response to the manual operation of the handle set 10.

The ball tap 6 is provided to selectively pass the supply water, which is supplied from a water supply source (not shown) through a water supply pipe 11, to the low tank 2 and the hand-washing water supply pipe 7. A base 6*a* of the ball tap 6 is connected to the water supply pipe 11 and the hand-washing water supply pipe 7. When the water level in the low tank 2 reaches a predetermined height, the ball tap 6 cuts off the supply of water to the low tank 2 and the hand-washing water supply pipe 7. When the water level in the low tank 2 does not reach a predetermined height, the ball tap 6 moves upward and downward depending on the water level in the low tank 2, to which water is supplied. The flushing pipe 9 guides the water flowing out from the low tank 2 to the toilet bowl as the result of the float valve 4 opening the opening.

When the handle set 10 is turned to the right (or to the left), the float valve 4, which is connected to the handle set 10 via the chain 5, opens the base 3*a* of the overflow pipe 3. As a result, the water 8, stored in the low tank 2, flows into the toilet bowl (not shown) via the flushing pipe 9, and waste in the toilet bowl is discharged into a public sewage pipe (not shown) or a septic tank (not shown) from the toilet bowl.

A hydrogen water generator 20 is provided in the low tank 2. As shown in FIG. 1, the hydrogen water generator 20 is disposed lower than the surface of the water 8. The hydrogen water generator 20 has a container 21. Ball-shaped magnesium particles 23, which are capable of reacting with water 22 to generate hydrogen gas, are encapsulated in the container 21 together with the water 22. In FIG. 1, reference numeral 30 indicates a partition plate fixed to the inner wall surface of the low tank 2 and the outer circumferential surface of the overflow pipe 3. The partition plate 30 prevents floating of the hydrogen water generator 20. Consequently, it is possible to keep the hydrogen water generator 20 submerged in the water 8.

The position of the hydrogen water generator 20 in the low tank 2 is not particularly restricted as long as the hydrogen water generator 20 is disposed lower than the surface of the water 8. Preferably, however, the hydrogen water generator 20 is disposed at a position at which the ball-shaped magnesium particles 23 can be agitated. Consequently, it is possible to easily strip white precipitate (cloudiness) of magnesium hydroxide from the surfaces of the magnesium particles 23 as the result of the magnesium particles 23 rubbing against each other. As a result, the frequency of contact between the water 22 and the magnesium particles 23 is increased, whereby it is possible to accelerate the chemical reaction between the water 22 and the magnesium particles 23.

The container 21 is made of an air-permeable and water-impermeable material. The term "air-permeable and water-impermeable material" mentioned in the present invention is a material that has a function of allowing hydrogen gas to pass from the inside to the outside of the container 21 (air permeability) and a function of preventing water from passing from the inside to the outside of the container 21 (water impermeability). At least one kind of thermoplastic resin selected from a group consisting of (A) polyvinylidene chloride, (B) polyvinyl chloride, and (C) polyacrylonitrile may be used as the air-permeable and water-impermeable material. Consequently, the container 21 may be made of a film obtained by forming at least one kind of thermoplastic resin selected from among (A) polyvinylidene chloride, (B) polyvinyl chloride, and (C) polyacrylonitrile The container 21 may have various shapes. In one example, two sheets of film may be formed into a shape in which a space between the films is filled with contents (the water 22 and the magnesium particles 23), and may be superimposed into a retort pouch-shaped container (for example, see FIG. 2(*a*)). In another example, the above film may wrap an opening of a receiving tray-shaped structure body having the water 22 and the magnesium particles 23 injected therein (for example, see FIG. 2(*c*)).

In a further example, a balloon structure body may be made of the above films, and a space defined in the balloon structure body may be filled with the water 22 and the magnesium particles 23. The balloon structure body may be provided with a check valve that allows air to flow only from the inside to the outside of the balloon structure body (for example, see FIG. 2(*b*)). A straw, which is made of vinyl, may be used as the check valve. The straw may be configured to have a structure in which, when air is introduced into the balloon structure body from the outside of the balloon structure body, the straw expands, with the result that the air can pass through the straw, while the straw is flat at other times, with the result that air cannot pass through the straw. Meanwhile, flowers or foilage plants that are capable of ingesting water containing plenty of hydrogen gas may be retained in the space defined in the balloon structure body.

In the hydrogen water generator 20 with the above-stated construction, it is possible to assuredly allow hydrogen gas to pass from the inside to the outside of the container 21 such that the hydrogen gas moves to the water 8 outside the container 21 in a state in which the hydrogen water generator 20 is placed in the low tank 2, since the container 21 is made of an air-permeable and water-impermeable material. In addition, it is possible to prevent the water 22 in the container 21 from passing from the inside to the outside of the container 21, ensuring that the water 22 cannot permeate into the water 8 outside the container 21. Consequently, it is possible to greatly reduce the amount of magnesium hydroxide that permeates into the water 8 from the inside of the container 21, as compared with the conventional hydrogen water generator. As a result, it is possible to prevent an increase in pH to such an extent that water 8 cannot be alkalinized and to generate water 8 containing plenty of hydrogen gas.

Figure 3:
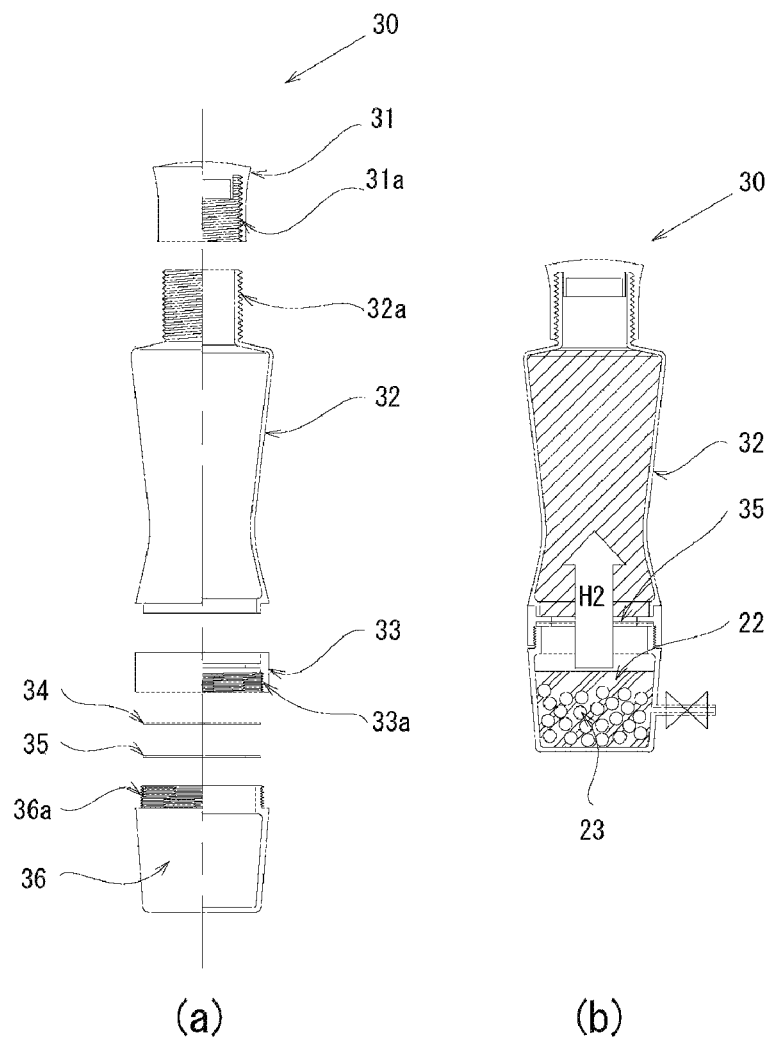
FIG. 3 is a view showing a hydrogen water generation container according to another embodiment of the present invention, wherein the left side of FIG. 3(a) on the basis of a center line X-X is shown in a side view while the right side of FIG. 3(a) on the basis of the center line X-X is shown in a sectional view.

Next, a hydrogen water generation container according to another embodiment of the present invention will be described with reference to FIG. 3. FIG. 3(*a*) is a side view of a hydrogen water generation container 30. Specifically, the left side of FIG. 3(*a*) on the basis of a center line X-X is shown in a side view, and the right side of FIG. 3(*a*) on the basis of the center line X-X is shown in a sectional view. In addition, FIG. 3(*b*) is a schematic view showing a function of generating hydrogen water without the generation of hydrogen gas or alkalinization in the hydrogen water generation container 30.

In addition, the hydrogen water generation container 30 generally includes a cap 31, a bottle body 32, a connection unit 33, and a hydrogen generator 36. The bottle body 32 stores skin lotion, shampoo, or rinse as a desired liquid (a solution) having hydrogen gas contained therein. Meanwhile, the bottom of the bottle body 32 is sealed by an O-ring 34, which will be described hereinafter, and an air-permeable and water-impermeable material 35. The bottle body 32 is provided at the outer circumference of the upper part thereof, which is connected to the cap 31, with a screw thread 32a. On the other hand, the cap 31 is open downward, and is provided around the inner wall thereof with a screw groove 31a. The cap 31 is screw-coupled to the bottle body 32 by rotating the cap 31 about the center line X-X.

The bottle body 32 is provided at the bottom thereof with a connection unit 33 for connection between the bottle body 32 and the hydrogen generator 36. The connection unit 33 is a hollow ring-shaped member. The connection unit 33 is securely fixed to the bottle body 32. The connection unit 33 is provided to connect the bottle body 32 to the hydrogen generator 36. The connection unit 33 is integrally formed at the bottle body 32. In this embodiment, the connection unit 33 is manufactured separately from the bottle body 32 to increase the convenience of the manufacturing process. However, the connection unit 33 and the bottle body 32 may be integrally molded as a single body. In addition, the lower part of the connection unit 33 is open downward, and a screw groove 33a is formed around the inner wall of the lower part of the connection unit 33.

Figure 2:
FIG. 2 is a view illustrating various shapes of a container.
Figure 2:
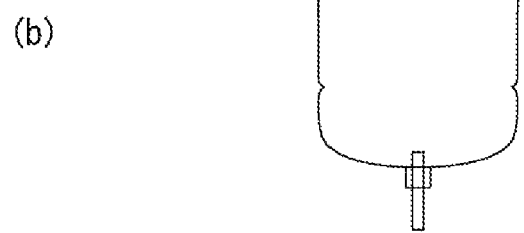
Figure 2:

The hydrogen generator 36 has the same function as the hydrogen water generator 20 shown in FIGS. 1 and 2. The hydrogen generator 36 is a container that is open upward in the same manner as shown in FIG. 2(c). Magnesium particles 23 and water 22 are received in the hydrogen generator 36. The magnesium particles 23 and the water 22 react as shown in chemical formula (1) above to evaporate only hydrogen gas (see an arrow in FIG. 3(b)). The opening of the upper part of the hydrogen generator is covered with the air-permeable and water-impermeable material 35, and a screw thread is provided at the upper part of the hydrogen generator 36. The hydrogen generator 36 is screw-connected to the screw groove 33a, which is formed at the lower part of the connection unit 33, via the O-ring 34. Consequently, the hydrogen generator 36 is sealed, owing to the properties of both the O-ring 34 and the air-permeable and water-impermeable material 35, such that moisture cannot permeate into the hydrogen generator 36. On the other hand, hydrogen gas passes through the air-permeable and water-impermeable material 35, whereby it is possible to constantly provide hydrogen gas into the liquid in the bottle body 32.

Figure 4:
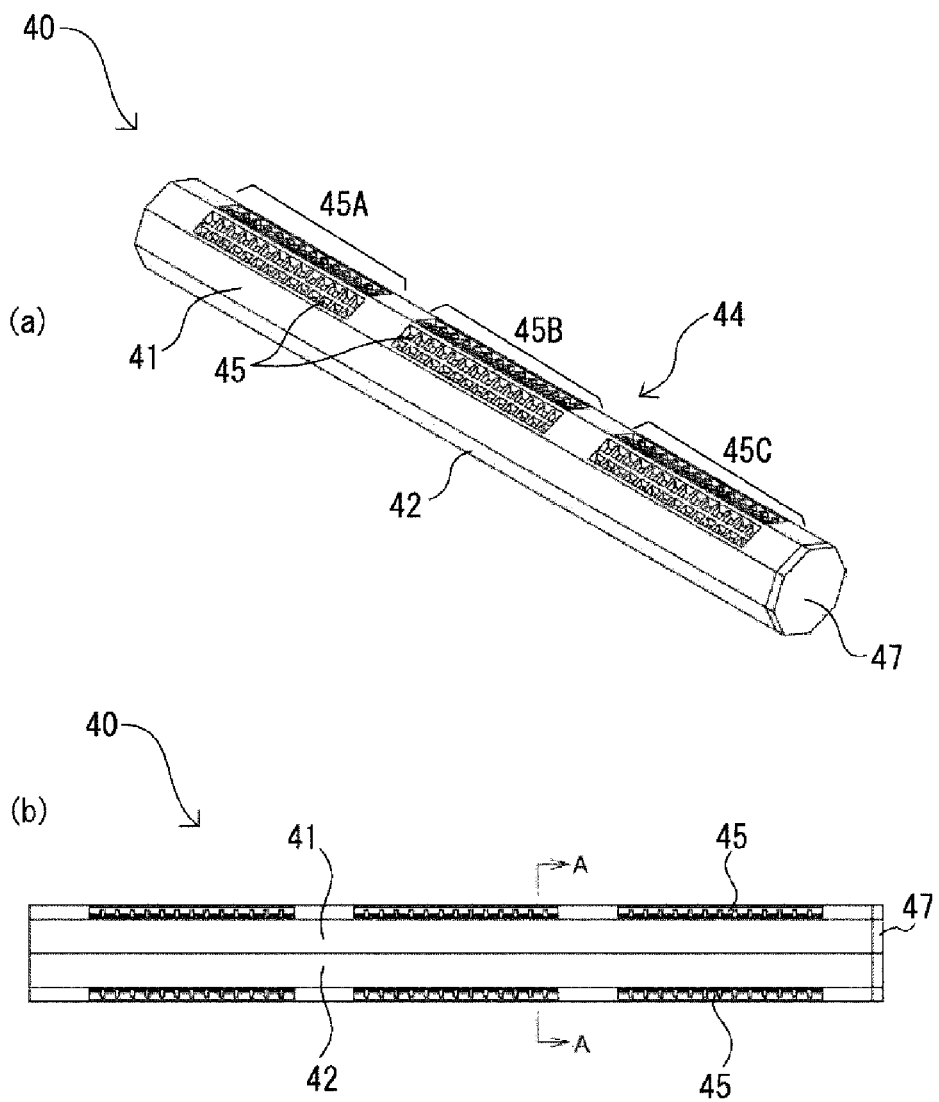
Figure 5:
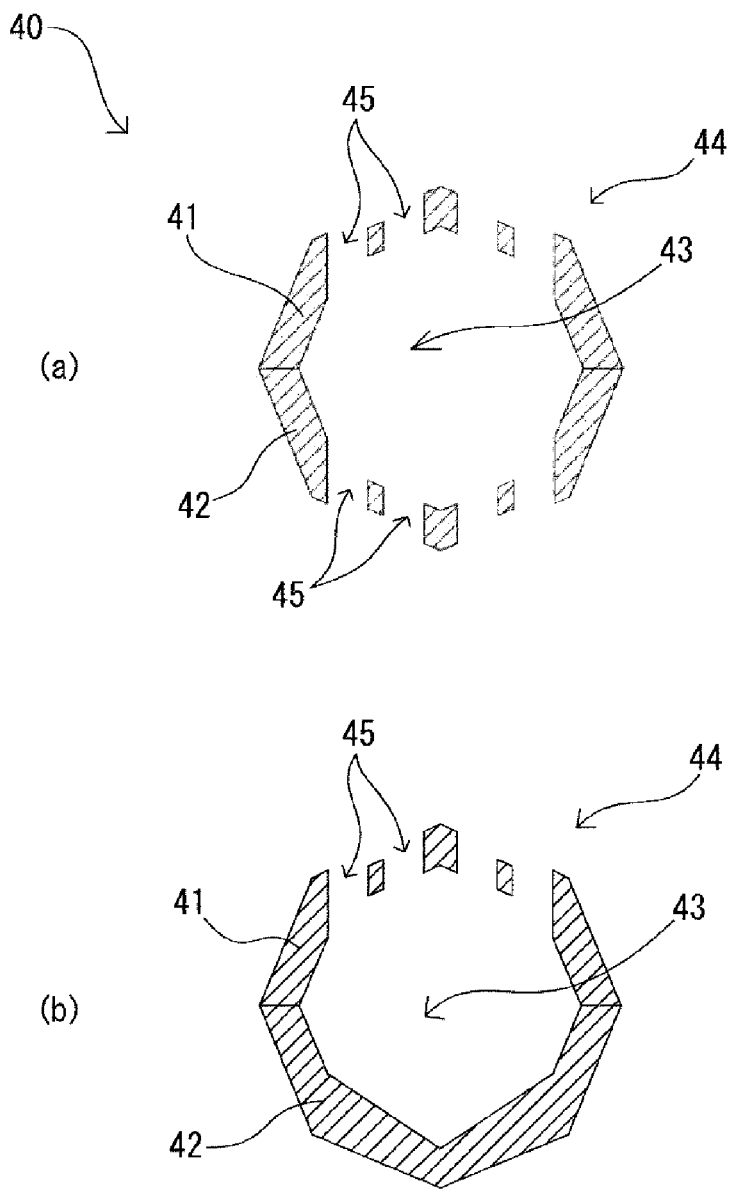
FIG. 5(a) is an enlarged sectional view taken along line A-A of FIG. 4(b), showing a state in which a window is formed in only one cover member in the hydrogen water generation container, which includes two cover members.
FIG. 5(b) is a view showing a state in which windows are formed in both the cover members in a modification of the hydrogen water generation container.
Figure 6:
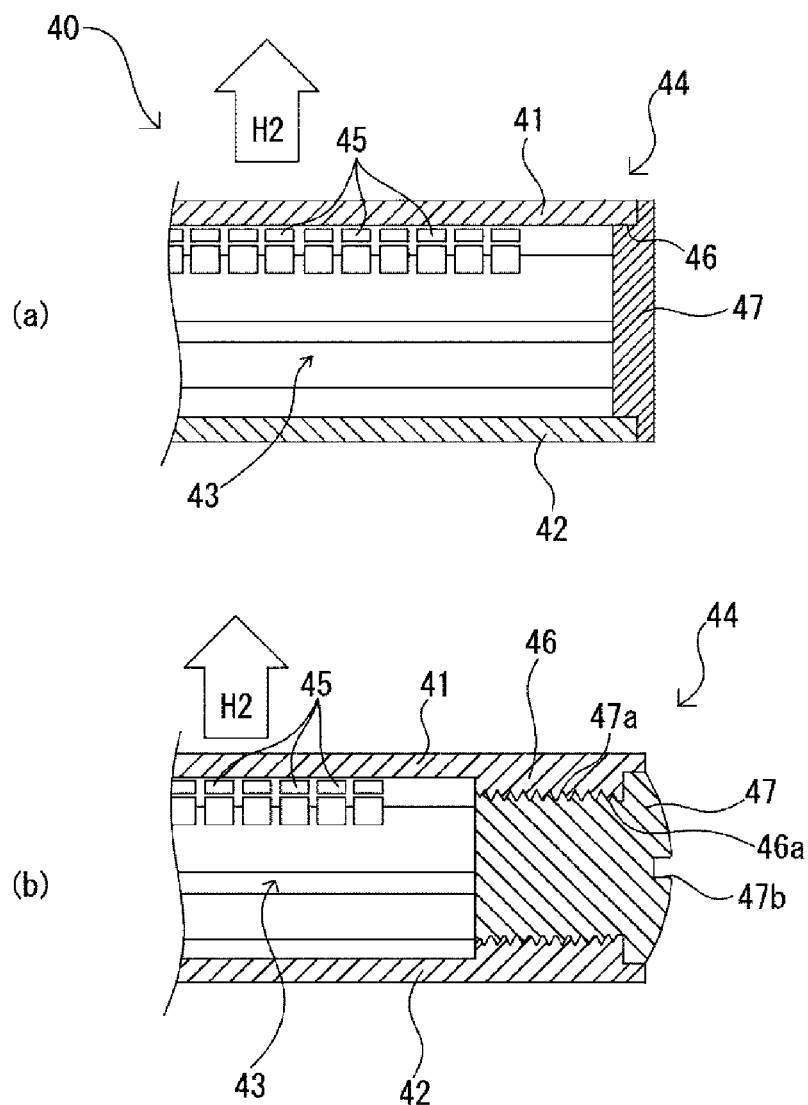
FIG. 6(a) is a side sectional view showing a sealing member in the hydrogen water generation container.
FIG. 6(b) is a side sectional view showing a modification of the sealing member in the hydrogen water generation container.

Next, a hydrogen water generation container according to another embodiment of the present invention will be described with reference to FIGS. 4 to 6. FIG. 4(a) is a perspective view of a hydrogen water generation container according to this embodiment, and FIG. 4(b) is a front view of the hydrogen water generation container according to this embodiment. FIG. 5(a) is a view showing a state in which a window is formed in only one cover member in the hydrogen water generation container according to this embodiment, which includes two cover members. FIG. 6(a) is a side sectional view showing a sealing member in the hydrogen water generation container according to this embodiment.

In addition, a hydrogen water generation container 40 includes a bar-shaped (stick-shaped) case body 44 formed by superimposing the outer circumferential parts of a first box-shaped cover member 41 having an opening and a second box-shaped cover member 42 having an opening, wherein the case body 44 has a hollow part 43, into which magnesium particles can be injected together with water. The case body 44 has a plurality of rectangular windows 45 for allowing the hollow part 43 to communicate with the outside of the case body 44 at both the first cover member 41 and the second cover member 42 (see FIG. 5(a)). A film (not shown), made of an air-permeable and water-impermeable material, is adhered to the windows 45 by insert molding. The film is provided only to cover the windows 45, and is not necessarily adhered to the windows 45. In one example, the film may be adhered to every window groups 45A to 45C formed at predetermined intervals in a longitudinal direction of the case body 44. In another example, the film may be adhered over the total length of the case body 44 in the longitudinal direction of the case body 44.

The case body 44 has an injection unit 46 that is formed at one end of the hydrogen water generation container 40 in a longitudinal direction thereof and communicates with the hollow part 43 to inject water into the hollow part 43. The hydrogen water generation container 40 further includes a sealing member 47 for sealing the injection unit 46. A cap member that can be separably coupled to the one end of the hydrogen water generation container 40 may be used as the sealing member 47. In the above construction, the hydrogen water generation container 40 is operated as follows. Magnesium particles are put in the hollow part 43 in advance. A user removes the cap member, and injects prepared water into the hollow part 43. As a result, the magnesium particles start to chemically react with the water according to chemical formula (1) above. Hydrogen gas, generated as the result of the chemical reaction, is discharged from the hollow part 43 out of the hydrogen water generation container 40 via the respective windows 45. Consequently, it is possible for the user to determine when it is possible to start to use the hydrogen water generation container 40, i.e. when to generate hydrogen gas. As a result, it is possible to prolong the lifespan of the hydrogen water generation container 40 as a product, as compared with the conventional hydrogen water generation container. Meanwhile, the injection of water into the hollow part 43 may be achieved using a tool, such as a spuit, which is used to suction an appropriate amount of water based on the specification of the hydrogen water generation container 40 and to move the suctioned water into another container. In addition, a filter for preventing waste or dust from being attached to the windows 45 and preventing the hollow part 43 from becoming clogged may be provided in the hollow part 43 as needed.

Figure 8:
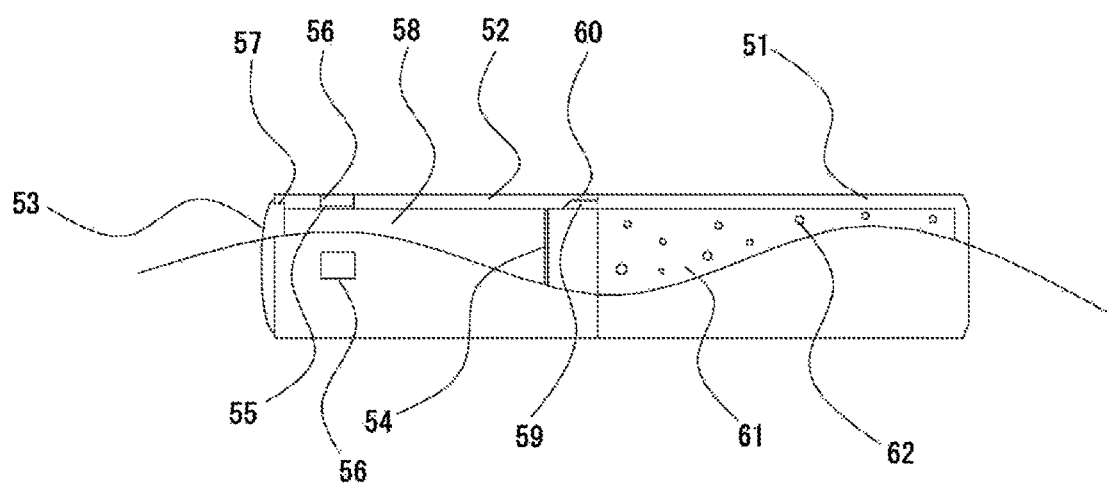
FIG. 8 is a schematic view showing a hydrogen water generation container according to another embodiment of the present invention.

Furthermore, a hydrogen water generator 50 according to another embodiment of the present invention will be described with reference to FIG. 8. FIG. 8 is a schematic view, partially in section, showing the structure of the hydrogen water generator 50 according to this embodiment. The hydrogen water generator 50 according to this embodiment generally includes a hydrogen gas generation container 51, a hydrogen gas guide pipe 52, a maintenance cover 53, a partition 54, a film 55, a window 56, a maintenance hole 57, a hollow part 58, a container-side engagement part 59, a pipe-side engagement part 60, water 61, and hydrogenated aluminum 62.

The hydrogen gas generation container 51 is formed in an approximately cylindrical shape having a hollow part defined therein. The hydrogen gas generation container 51 is provided at one side thereof with an opening and a container-side engagement part 59, which can be screw-engaged. In addition, the hydrogen gas guide pipe 52 is formed in an approximately cylindrical shape having a hollow part 58 defined therein. The hydrogen gas guide pipe 52 is provided at one side thereof with an opening and a pipe-side engagement part 60, which can be screw-engaged. Furthermore, the hydrogen gas guide pipe 52 is provided at the other side thereof with a maintenance hole 57. In addition, the hydrogen gas guide pipe 52 is provided with a plurality of windows 56 for allowing the hollow part 58, in the hydrogen gas guide pipe 52, to communicate with the outside of the hydrogen gas guide pipe 52. A film 55, made of an air-permeable and water-impermeable material, is adhered to the windows 56 by insert molding. Furthermore, at least one partition 56, made of the same air-permeable and water-impermeable material as the film 55, is provided in the hollow part 58 in order to partition the hollow part 58. The maintenance hole 57 is covered by the maintenance cover 53 such that the user is capable of selectively removing the maintenance cover 53 from the maintenance hole 57 in order to maintain (for example, drain and clean) the interior of the hollow part 58.

In order to use the hydrogen water generator 50 according to this embodiment, the user releases the screw-engagement between the hydrogen gas generation container 51 and the hydrogen gas guide pipe 52, injects a predetermined amount of water 61 and hydrogenated aluminum 62 into the hydrogen gas generation container 51, and connects the hydrogen gas generation container 51 with the hydrogen gas guide pipe 52 by screw-engagement therebetween. The water 61 reacts with the hydrogenated aluminum in the hydrogen gas generation container 51 to generate hydrogen gas. The hydrogen gas is transferred into the hydrogen gas guide pipe 52. The hydrogen gas permeates the partition 54, provided in the hollow part 58 defined in the hydrogen gas guide pipe 52, and is guided to the windows 56 (when the hydrogen gas permeates the partition 54, the water 61 and the hydrogenated aluminum 62 in the hydrogen gas generation container 51 are prevented from passing through the partition 54). At this time, in the reaction between the water 61 and the hydrogenated aluminum 62, a large amount of hydrogen gas is generated in a shorter time than in a case of the reaction using magnesium. As a result, high pressure is applied to the partition 54 in a direction from the hydrogen gas generation container 51 to the hydrogen gas guide pipe 52. Although the hydrogen gas permeates the partition 54, micro holes (not shown), formed in the partition 54 through which the hydrogen gas passes, may be expanded by the pressure. However, since the film 55 is provided between the partition 54 and the outside of the hydrogen water generator 50, leakage of water to the outside to the hydrogen water generator 50 is prevented by the provision of the film 55 even when the water 61 unintentionally permeates the partition 54. The hydrogen gas permeates the film 55, which is adhered to the windows 56, passes through the windows 56, and is discharged from the hydrogen water generator 50.

In addition, it is possible for the user to remove the maintenance cover 53 from the maintenance hole 57, formed in the hydrogen gas guide pipe 52, and to maintain (for example, clean) the interior of the hollow part 58. At the same time, it is possible to discharge the water 61 from the hollow part 58 even when the water 61 permeates the partition 54 as described above.

Figure 9:
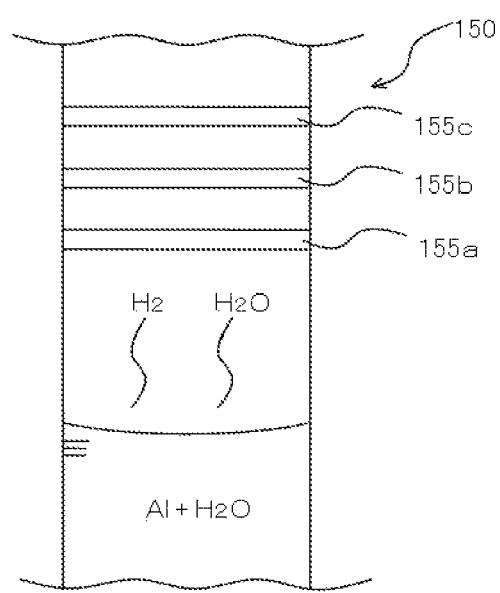
FIG. 9 is a schematic partial view showing the upper part of a hydrogen water generator according to another embodiment of the present invention.

A hydrogen water generator 150 according to a further embodiment of the present invention will be described with reference to FIG. 9. FIG. 9 is a schematic partial view showing the upper part of the hydrogen water generator 150 according to this embodiment. Films 155a, 155b, and 155c, made of an air-permeable and water-impermeable material, are arranged at intervals in the hydrogen water generator 150. When hydrogen gas and vapor ($H_2$ and $H_2O$) fill the interior of the hydrogen water generator 150, and therefore the pressure in the hydrogen water generator 150 increases, the pressure is sequentially reduced by the films. Consequently, even though the pressure in the hydrogen water generator 150 excessively increases with the result that the micro holes formed in the first film 155a are enlarged and water (vapor) permeates the first film 155a in addition to hydrogen gas, the pressure in the hydrogen water generator 150 is gradually reduced before reaching subsequent films with the result that the sizes of the micro holes formed in the subsequent films are gradually reduced and water is prevented from permeating the subsequent films. Consequently, it is possible to assuredly discharge only hydrogen gas from the hydrogen water generator 150 and to prevent water from being discharged from the hydrogen water generator 150.

Figure 10:
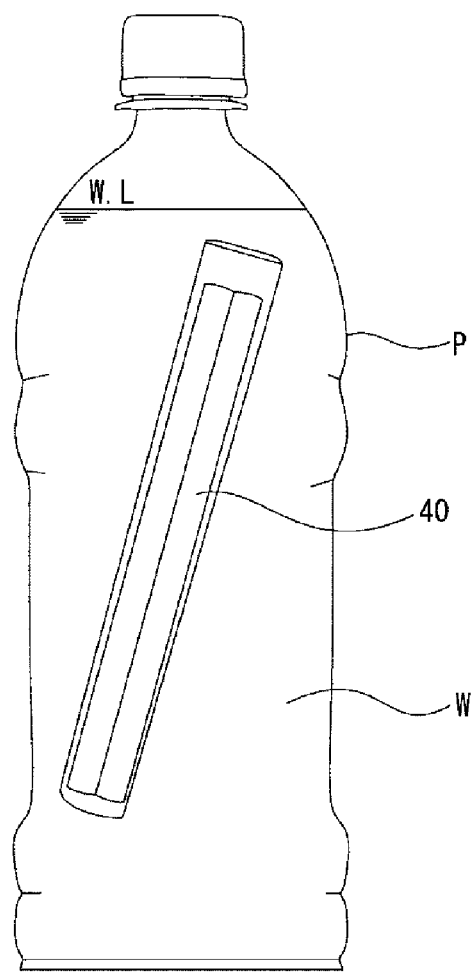
FIG. 10 is a view schematically showing the structure of an example of a pet bottle to which a hydrogen water generator according to a further embodiment of the present invention is applied.

Next, an example of a pet bottle P, to which the hydrogen water generator container 40 of FIG. 4 is applied, will be described with reference to FIG. 10. A flavor ingredient is contained in the hydrogen water generation container 40, in addition to hydrogen gas, magnesium particles, and water. The flavor ingredient contains at least one kind of compound selected from a group consisting of (R)-4-(2,6,6-trimethyl-2-cyclohexene-1-yl)-3-butene-2-one (hereinafter, also referred to as (R)-α-ionone) and (S)-4-(2,6,6-trimethyl-2-cyclohexene-1-yl)-3-butene-2-one (hereinafter, also referred to as (S)-α-ionone) as an effective ingredient. The flavor ingredient may be added to impart the following types of products with flavor: drinks, such as juice, fruity alcoholic beverages, milk drinks, carbonated water, soft drinks, and health drinks; popular drinks, such as coffee, cocoa, tea, oolong tea, and green tea; and soups, such as Japanese-style soup, Western-style soup, and Chinese-style soup. In FIG. 10, the pet bottle P is filled with a soft drink W, and the hydrogen water generation container 40 is immersed in the soft drink W. A flavor ingredient generated together with hydrogen gas in the hydrogen water generation container 40 is supplied into the soft drink W. Consequently, a unique fragrance or flavor that can provide a relaxing feeling or a fresh feeling is imparted to the soft drink W in the pet bottle P.

Although the embodiments of the present invention have been described with reference to the drawings, the detailed construction of the present invention is not limited to the illustrated embodiments. The present invention covers the modifications and variations of this invention provided they come within the scope of the appended claims and their equivalents.

Meanwhile, although the case body 44 has a plurality of windows 45 on both the first cover member 41 and the second cover member 42 in the hydrogen water generation container 40 (see FIG. 5(a)), the present invention is not limited thereto. The case body 44 may have a plurality of windows 45 on only the first cover member 41 (see FIG. 5(b)).

Meanwhile, although the injection unit 46 is sealed by the cap-shaped sealing member 47 in the hydrogen water generation container 40 (see FIG. 6(a)), the sealing member 47 may be provided on the outer circumferential surface thereof with a male screw part 47a, and the injection unit 46 may be provided on the inner circumferential surface thereof with a female screw part 46a (see FIG. 6(b)) such that the injection unit 46 can be sealed by the sealing member 47 via the screw-engagement between the male screw part 47a and the female screw part 46a. Furthermore, one end of the sealing member 47 may have a recessed part 47b with which the sealing member 47 can be turned by a simple operation using coins, such as dimes or quarters (see FIG. 6(b)).

Figure 7:
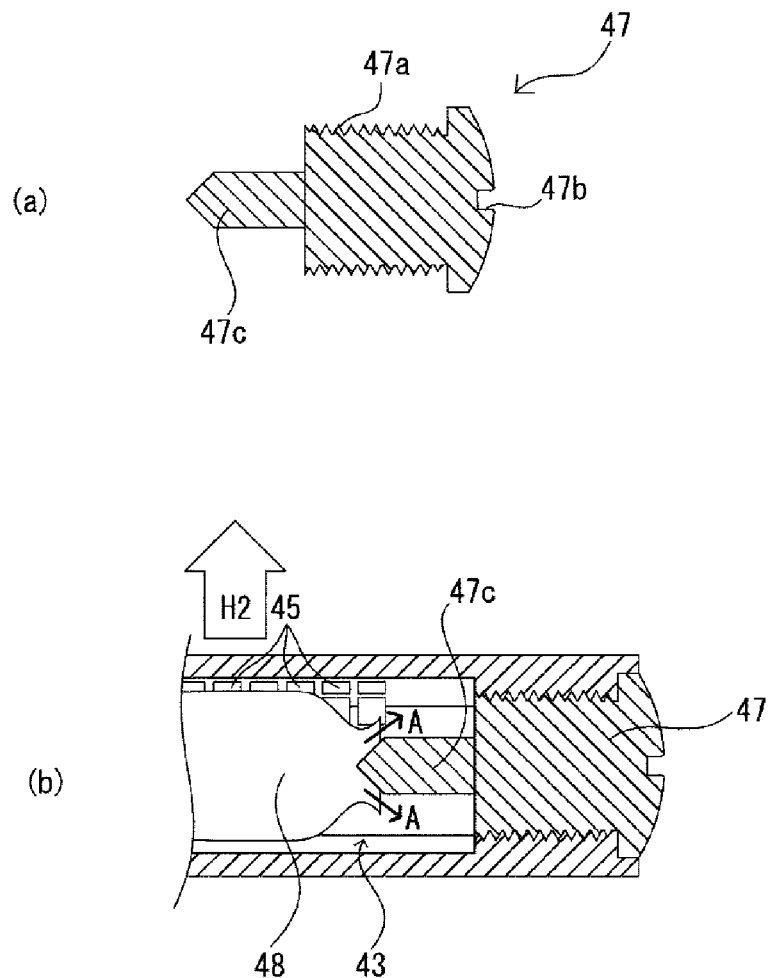
FIG. 7(a) is a side sectional view showing another modification of the sealing member in the hydrogen water generation container.
FIG. 7(b) is a view illustrating a state in which a water bag is broken through by a needle-shaped protrusion formed at the sealing member according to the another modification.

In addition, the hydrogen water generation container shown in FIG. 6(b) may be further modified such that the sealing member includes a needle-shaped protrusion 47c protruding from the tip thereof (see FIG. 7(a)), and the protrusion (needle-shaped protrusion) 47c may break through a water bag (a bag containing water) 48, placed in advance in the hollow part 43 of the hydrogen water generation container 40, such that the water in the water bag 48 can be injected into the hollow part 43 (see FIG. 7(b)). FIG. 7(b) shows a state in which the sealing of the injection unit 46 by the sealing member 47 is completed as the result of screw-engagement between the male screw part 47a and the female screw part 46a. In this state, water is discharged from the interior of the water bag 48, which has been broken through, in a direction indicated by an arrow A in FIG. 7(b), and chemically reacts with magnesium particles, received in the hollow part 43 in advance, according to chemical formula (1) above. Consequently, hydrogen gas generated as the result of the chemical reaction is discharged from the hollow part 43 to the outside of the hydrogen water generation container through the respective windows 45. Meanwhile, the water bag 48 is filled in advance with water in an amount quantitatively determined via a previous molar calculation based on the amount of magnesium particles received in the hollow part 43. The water bag 48 may be fixed in the hollow part 43 such that the water bag 48 can be broken through by the needle-shaped protrusion 47c. In addition, the material for the water bag 48 is not particularly restricted as long as the water bag 48 is sufficiently brittle that a channel for discharging water into the hollow part 43 can be formed through the water bag 48 while the water bag 48 is sufficiently hard that the water bag 48 can be broken through only by the needle-shaped protrusion 47c.

Meanwhile, although the magnesium particles and the water are encapsulated in the container, made of the air-permeable and water-impermeable material, in the hydrogen water generator 20 and the hydrogen generator 36, the present invention is not limited thereto. A gel-state water retainer may be encapsulated in the container, made of the air-permeable and water-impermeable material, together with the magnesium particles.

INDUSTRIAL APPLICABILITY

A hydrogen water generator according to an embodiment of the present invention enables hydrogen to be contained in water stored in a low tank of a toilet device or in purified water stored in a storage tank of a water server. Consequently, the present invention can be appropriately used to generate hydrogen water.

In addition, a hydrogen water generation container according to another embodiment of the present invention can be used as a dedicated container having therein hydrogen gas contained in skin lotion, shampoo, etc.

DESCRIPTION OF REFERENCE NUMERALS AND SYMBOLS

20 Hydrogen water generator
21 Container
22 Water
23 Magnesium particles
30, 40, 50 Hydrogen water generation containers
31 Cap
31a, 33a Screw groove
32 Bottle body
32a Screw thread
33 Connection unit
34 O-ring
36 Hydrogen generator
41 First cover member
42 Second cover member
43 Hollow part
44 Case body
45 Windows
45A to 45C Window groups
46 Injection unit
46a Female screw part
47 Sealing member
47a Male screw part
47b Recessed part
47c Needle-shaped protrusion
48 Water bag
51 Hydrogen gas generation container
52 Hydrogen gas guide pipe
53 Maintenance cover
54 Partition
55 Film
56 Window
57 Maintenance hole
58 Hollow part
59 Container-side engagement part
60 Pipe-side engagement part
61 Water
62 Hydrogenated aluminum

The invention claimed is:

1. A hydrogen generation container, comprising:
a hydrogen gas generation container including water and hydrogenated aluminum powder, the hydrogenated aluminum powder capable of reacting with the water to generate hydrogen gas therein; and
a hydrogen gas guide pipe connected with the hydrogen gas generation container and comprising a hollow part defined therein and a plurality of films disposed between the hollow part and the hydrogen gas generation container for allowing the hollow part to communicate with an outside of the hydrogen gas guide pipe and for allowing the hydrogen gas to pass therethrough and preventing the water from passing therethrough,
wherein the plurality of films are configured to gradually reduce a pressure of the hydrogen gas passing therethrough, and
wherein the plurality of films are arranged at predetermined intervals in the hydrogen gas guide pipe in an axial direction.

* * * * *